2,907,777
HYDROGENATED LECITHIN AND PROCESS FOR PREPARING SAME

Robert D. Cole, Oak Park, Ill., assignor to The Glidden Company, Cleveland, Ohio, a corporation of Ohio No Drawing. Application April 26, 1957
Serial No. 655,198

16 Claims. (Cl. 260—403)

This invention relates to hydrogenated lecithin prepared by hydrogenation in the presence of certain chlorinated solvents, and to similarly-hydrogenated phosphatides and/or phosphatide fractions.

Hydrogenated phosphatidic materials (such as hydrogenated lecithin) are useful emulsifiers. They differ from the corresponding natural phosphatides in being more stable, more easily bleached to a light color, and frequently in being more granular in nature. Although known for many years, hydrogenated phosphatides have not been available commercially because the known procedures for preparation have been quite impracticable.

Previous publications taught that hydrogenated phosphatides could be prepared in the laboratory at very high pressure. (Cf., Chemical Abstracts 28, p. 7566 (1934)), but attempts to use low pressure equipment were unsatisfactory (cf., Chemical Abstracts 34, p. 3380 (1940)). The procedures did not offer a practical process for preparing hydrogenated phosphatides on a commercial basis. Consequently, no isolated hydrogenated phosphatides have been available commercially. It has also been the general belief that phosphatides or oil containing phosphatides could not be hydrogenated in ordinary kettles and equipment because the phosphatides inactivated the catalyst. Therefore, vegetable oils have been "degummed" prior to hydrogenation and no hydrogenated phosphatides have been available commercially from this source.

The present invention involves the discovery that the presence of certain chlorinated solvents inhibits or prevents inactivation of the catalyst and permits hydrogenation to occur at ordinary pressures and temperatures. This has made possible the hydrogenation of lecithin in commercial equipment at room temperatures or slightly elevated temperatures. It has also made possible the hydrogenation at low pressure of non-gummed vegetable oils.

One object of this invention is to provide a process for preparing hydrogenating vegetable phosphatides at intermediate or low pressures so that the process can be carried out commercially in equipment that is ordinarily available to phosphatide processers.

Another object is to provide improved, time-stable, hydrogenated phosphatides.

A further object is to provide an improved process for hydrogenating phosphatides, the improvement residing primarily in conducting the hydrogenation in the presence of certain chlorinated solvents.

These and other objects will be apparent from the foregoing and following description of the inventions.

I have now discovered that certain chlorinated solvents prevent the inactivation of the hydrogenation catalyst which otherwise occurs when phosphatide material and a catalyst is treated with hydrogen. In the absence of a chlorinated solvent, solutions of phosphatides in solvents such as alcohol, hexane, cyclohexane, mineral oil or vegetable oil are not effectively hydrogenated at ordinary temperatures and pressures, because the solutions or some component therein inactivates the catalyst before the desired hydrogenation has taken place. The chlorinated solvents which I have found to be most suitable for my purposes are methylene chloride, chlorobenzene, and chloroform. One or more of these chlorinated solvents can be used as the solvent for the phosphatidic material to be hydrogenated or can be used as one component of a mixed solvent system. A mixture of methylene chloride and ethanol is very effective. The relative proportions of total solvent to phosphatide can be varied widely. It is desirable, however, to use enough solvent to give and retain a solution of moderately low viscosity, and to this end we prefer to have the phosphatides constitute less than about 50% of the whole solution, by weight. Of this total solvent, at least 10% by volume thereof should be the chlorinated solvent(s). The remainder, if any, should preferably be selected from the group consisting of alcohols, hydrocarbons, mineral oil, vegetable oil, and mixtures thereof. Solvents which react with hydrogen under the present hydrogenation conditions should, of course, be avoided so as to eliminate this waste of hydrogen and solvent. Acetone is an example of such a phosphatide solvent.

My discovery of the merits of these solvents or solvent mixtures has now made it possible to hydrogenate phosphatides at temperatures between about 32° F. and 175° F., and at atmospheric or elevated pressures up to about 120 lbs. gauge pressure. Pressures below atmospheric can also be used, but result in slower hydrogenation rates. I therefore prefer pressures between about 0 and 120 lbs. gauge pressure. At pressures above about 120 lbs. gauge the hydrogen begins to react with the chlorinated solvents. The extent of this reaction depends not only on the pressure but also on the particular chlorinated solvent which is present. Accordingly, hydrogenation of phosphatides can, if desired, be carried out at pressures somewhat higher than 120 lbs. gauge, but such treatment is apt to be both uneconomical and technically undesirable. At pressures up to about 120 lbs. gauge, the solvents enumerated above are not reactive with the hydrogen and can be recovered for repeated re-use.

The phosphatides which can be hydrogenated in accordance with this invention include all vegetal phosphatides such as soya, corn, animal, etc., or their various fractions such as the alcohol-soluble and alcohol-insoluble moieties thereof. In addition, I have found that even the phosphatides which are present in vegetable oils, e.g., soybean oil, can be hydrogenated without first separating the phosphatides from the oil. Also, crude phosphatides, such as the concentrated, crude material obtained commercially from vegetable oils (e.g., crude soya lecithin containing about 60% soya phosphatides, balance soybean oil) can be effectively hydrogenated without separating the phosphatides from the oil.

As indicated above, the hydrogenation can be conducted effectively at atmospheric and higher temperatures. Since phosphatides are quite heat-labile so that it is preferable to treat them at the lowest convenient temperatures conducive to commercial practice, preferably between about 70° F. and 175° F. ordinary commercial hydrogenation equipment can be used. Platinum and palladium catalysts are satisfactory but certain other hydrogenation catalysts, such as nickel and copper chromite do not function effectively under the conditions employed.

The hydrogenation can be carried out effectively under the conditions set forth above so as to reduce the initial unsaturation of the phosphatides to low values (e.g., I.V. 10 or lower) or to intermediate iodine values, if desired. Commercially-useful rates of reduction are secured.

The following examples illustrate the principles of my

EXAMPLE 1

*Hydrogenation of corn oil lecithin*

20 grams of corn oil lecithin having an iodine value of 88 was dissolved in 200 cc. of methylene chloride and agitated under a hydrogen pressure ranging from 22 to 2 p.s.i. in the presence of .6 gram of 10% palladium on charcoal for 20 minutes. After filtration to remove the catalyst and distillation to remove the methylene chloride, a solid product having an iodine value of 31.7 was obtained.

EXAMPLE 2

*Hydrogenation of lecithin in the presence of vegetable oil*

3 grams of crude soya lecithin (about 60% lecithin) was dissolved in 30 grams of soybean oil and 100 cc. of methylene chloride. This solution was shaken under 6 to 24 p.s.i. hydrogen pressure for 20 minutes in the presence of .9 gram of 10% palladium on charcoal. After filtration to remove the catalyst and distillation to remove the methylene chloride, a plastic material having an iodine value of 30 was obtained. Isolation of the lecithin fraction after hydrogenation gave material having an iodine value of 0 as compared to 72.7 for the starting lecithin.

EXAMPLE 3

*Hydrogenation of the alcohol soluble fraction of lecithin in chlorobenzene*

15 grams of refined alcohol soluble lecithin was dissolved in 150 cc. of chlorobenzene. This solution was shaken under a hydrogen pressure of 1 to 22 p.s.i. in the presence of 0.45 gram of 10% palladium on charcoal. 88% of the theoretical amount of hydrogen was absorbed in 37 minutes.

EXAMPLE 4

*Hydrogenation of alcohol soluble lecithin in methylene chloride*

350 grams of refined alcohol soluble lecithin was dissolved in 2.5 liters of methylene chloride. This solution was shaken in a hydrogen atmosphere of 0 to 30 cm. Hg manometer pressure in the presence of 8.0 grams of 10% palladium on charcoal catalyst for 2 hours. After filtration to remove the catalyst and distillation to remove the methylene chloride a waxy powder was obtained which had an iodine value of 21.

EXAMPLE 5

*Hydrogenation of refined lecithin in coloroform*

10 grams of refined lecithin were dissolved in 100 cc. of chloroform and shaken under a hydrogen pressure of 6 to 16 p.s.i. in the presence of .3 gram of 10% palladium on charcoal. 65% of the theoretical hydrogen was absorbed in 4 hours.

EXAMPLE 6

*Use of platinum as a catalyst in the hydrogenation of lecithin*

10 grams alcohol soluble lecithin was dissolved in 100 cc. of methylene chloride. This solution was added to .3 gram of platinum oxide and shaken under a hydrogen pressure of 6 to 22 p.s.i. After 30 minutes the reaction was stopped, catalyst filtered off, and the methylene chloride removed under vacuum. The light tan granular product had an iodine value of 13. The lecithin had an iodine value of 88 originally.

EXAMPLE 7

*Hydrogenation of lecithin in methylene chloride-ethanol*

350 grams of refined alcohol soluble lecithin having an iodine value of 92.3 was dissolved in 2.5 liters of methylene chloride and 1.0 liter of 95% ethanol (SD3A). This solution was hydrogenated for 140 minutes in the presence of 11.0 grams of 10% palladium on charcoal catalyst. The hydrogen pressure was maintained in the range 0 to 30 cms. Hg. After removal of the catalyst and solvent the product was a granular solid having an iodine value of 14.4. It should be noted that the small amount of water present in the ethanol does no harm.

EXAMPLE 8

*Attempted hydrogenation of lecithin in cyclohexane*

10 grams of refined granular lecithin were dissolved in 100 cc. of cyclohexane. This solution was shaken for 4.5 hours under 15 p.s.i. hydrogen pressure in the presence of 0.3 gram of 10% palladium on charcoal. Only 7% of the theoretical quantity of hydrogen was absorbed in this period before the reaction stopped.

This run was repeated using alcohol soluble lecithin. Only 15% of the theoretical amount of hydrogen was consumed in 11 hours.

In each of Examples 1–7, the filtrate which was secured after filtering off the catalyst was very dark. The phosphatides recovered from the filtrates were somewhat dark also, but by bleaching them with 1–3% of 50% hydrogen peroxide, very light-colored products were secured. The bleached products and the unbleached products had excellent keeping qualities. They also possessed undiminished emulsifying qualities, when compared with the original materials from which they were produced, and in some instances exhibited improved emulsifying qualities.

It will be understood that the choice of solvent or solvent mixture is apt to be a matter of personal preference, or of expediency. A high-boiling solvent would ordinarily not be selected unless the end-use of the hydrogenated phosphatide is such that removal of the solvent is unnecessary. Where the solvent is to be removed, one should choose a low boiling solvent or solvent mixture so that the hydrogenated phosphatides will not be harmed by the heating which is needed to distill the solvent away. Other methods for recovering the hydrogenated phosphatides from the solution can, of course, be used.

Having now described my invention what I claim is:

1. The improved method for hydrogenating phosphatides which comprises subjecting said phosphatides to contact with hydrogen and a hydrogenation catalyst selected from the group platinum and palladium at pressures between about 0 and 120 lbs. gauge pressure and at temperatures between about 32° F. and 175° F., said phosphatides, while being so treated, being in the form of a solution in which at least 10% by volume of the total solvent for the phosphatides is selected from the group consisting of chloroform, chlorobenzene, methylene chloride and mixtures of the foregoing.

2. The method as claimed in claim 1 wherein the phosphatides are vegetable phosphatides.

3. The method as claimed in claim 2 wherein the sole solvent is a chlorinated solvent selected from the group consisting of chloroform, chlorobenzene and methylene chloride.

4. The method as claimed in claim 2 wherein the chlorinated solvent is methylene chloride.

5. The method as claimed in claim 2 wherein the phosphatides are soybean phosphatides.

6. The method as claimed in claim 5 wherein the sole solvent is methylene chloride.

7. The method as claimed in claim 5 wherein the soybean phosphatides consist of the alcohol-soluble moiety of soybean phosphatides.

8. The method as claimed in claim 7 wherein the sole solvent is methylene chloride.

9. The method as claimed in claim 5 wherein the soybean phosphatides consist of the alcohol insoluble moiety of soybean phosphatides.

10. The method as claimed in claim 9 wherein the sole solvent is methylene chloride.

11. The method of hydrogenating vegetable phosphatides which are dissolved in and indigenous to vegetable oil, which comprises admixing with said oil-solution of phosphatides at least 10% by volume of chlorinated solvent selected from the group consisting of chloroform, chlorobenzene, methylene chloride, and mixtures of the foregoing; and contacting said solution with hydrogen and hydrogenation catalyst selected from the group consisting of platinum adn palladium, at temperatures between about 32° F. and 175° F. and pressures between about 0 and 120 lbs. gauge pressure.

12. The method as claimed in claim 11 wherein the solvent, other than soybean oil, is methylene chloride.

13. The method as claimed in claim 11 wherein the vegetable phosphatides are soybean phosphatides and wherein the vegetable oil is soybean oil.

14. The method as claimed in claim 13 wherein the vegetable phosphatides are soybean phosphatides and wherein the vegetable oil is soybean oil.

15. Hydrogenated phosphatides as prepared by the method of claim 1.

16. A vegetable oil solution of hydrogenated phosphatides as prepared by the method of claim 11.

References Cited in the file of this patent

FOREIGN PATENTS

| | | |
|---|---|---|
| 256,998 | Germany | Feb. 23, 1913 |
| 279,200 | Germany | Oct. 14, 1914 |
| 280,695 | Germany | Nov. 25, 1914 |
| 389,298 | Germany | Jan. 29, 1924 |
| 389,299 | Germany | Jan. 29, 1924 |
| 73,861 | Switzerland | Feb. 28, 1914 |

OTHER REFERENCES

Shinozaki et al.: J. Soc. Chem. Ind. Tokio 37, 432–433 (1934).

Jacini: Chemical Abstracts 49, 16467 (1945).

A.C.S. Monograph No. 112, The Phosphatides, pages 61 and 62 (1951), Reinhold Publishing Corp., New York, N.Y.